United States Patent [19]

Shimizu

[11] Patent Number: 5,782,441
[45] Date of Patent: Jul. 21, 1998

[54] CABLE LAYING APPARATUS

[75] Inventor: Shohachi Shimizu, Gifu, Japan

[73] Assignee: Mirai Industries, Co., Ltd., Gifu, Japan

[21] Appl. No.: 363,724

[22] Filed: Dec. 23, 1994

[30] Foreign Application Priority Data

Dec. 27, 1993 [JP] Japan ................... 5-330445
Jul. 12, 1994 [JP] Japan ................... 6-160267

[51] Int. Cl.$^6$ ........................ F16L 3/22
[52] U.S. Cl. ........................ 248/68.1; 248/58
[58] Field of Search ................ 248/58, 49, 320, 248/68.1, 674, 74.2, 316.7; 211/113, 118, 175; 403/293, 292, 362

[56] References Cited

U.S. PATENT DOCUMENTS

| | | | |
|---|---|---|---|
| 2,905,416 | 9/1959 | Wiegand | 248/58 |
| 3,042,351 | 7/1962 | DuBois | 248/49 |
| 3,246,433 | 4/1966 | Eriksson | 403/292 X |
| 3,448,955 | 6/1969 | Fussell | 248/58 |
| 3,521,843 | 7/1970 | Ogle | 248/58 |
| 3,598,349 | 8/1971 | Drake | 403/292 X |
| 3,915,420 | 10/1975 | Norris | 248/58 |
| 4,314,771 | 2/1982 | Lambert | 403/362 X |
| 4,367,979 | 1/1983 | Milligan | 403/362 X |
| 5,106,050 | 4/1992 | Vacarro et al. | 403/362 X |
| 5,256,002 | 10/1993 | Shimizu | 248/49 X |

FOREIGN PATENT DOCUMENTS 1492415   11/1977   United Kingdom ............... 248/58

Primary Examiner—Ramon O. Ramirez
Assistant Examiner—Gwendolyn W. Baxter
Attorney, Agent, or Firm—Hale and Dorr LLP

[57] ABSTRACT

Cable laying apparatuses are disclosed, each comprising a plurality of cable racks and fasteners. A cable rack is provided with at least one longitudinally and horizontally extending hook portion. A fastener is provided with at least one longitudinally and horizontally extending hook portion and a plurality of threaded through screw holes. Cable racks and fasteners used in a cable laying apparatus have corresponding hook portions so that the hook portions of the cable racks and those of the fasteners properly engage with each other. Threaded through screw holes may be provided in a direction other than the direction of the openings of the hook portions of fasteners so that the engagement between the hook portions of the fasteners and the hook portions of corresponding cable racks may be more secure in two directions as the screws having a flat bottom in the screw holes are screwed and press the cable racks. Cable racks each has a longitudinally and horizontally extending flat surface to receive screws perpendicularly.

6 Claims, 16 Drawing Sheets

CABLE LAYING APPARATUS

BACKGROUND OF THE INVENTION

1. Field of the Invention

This invention generally relates to a cable laying system comprising a plurality of cable racks and fasteners used to connect those cable racks in a line. More particularly, this invention relates to an improved cable laying apparatus comprising improved cable racks and improved fasteners, which provides both easier preparation of overhead cable laying routes and easier cable laying operation.

2. Description of the Prior Art

Electric cables are often laid on overhead cable ladders or racks prepared over or under a ceiling. Such cable racks are usually suspended from ceilings, walls or roof portions of a building and installed along cable laying routes using metal fasteners which are placed on the connection part of each two cable racks. The fasteners fastened to cable racks with bolts and nuts hold the cable racks together in alignment.

It takes considerable time and trouble to complete an overhead cable laying route with such cable racks and fasteners. It also takes considerable time and trouble to lay cables on such cable racks.

It usually requires strenuous labor to lay a comparatively heavy electric cable on overhead cable racks. It is usual that at least two workers are required to lay a comparatively heavy cable on overhead cable racks. A worker needs to move his stepladder little by little under overhead cable racks along the cable laying route to first lay a pilot rope on the cable racks. After the pilot rope has been laid on the cable racks, an electric cable is connected to either end of the pilot rope. The pilot rope is then pulled on the cable racks from the other end and the cable is dragged onto the cable racks. Another worker is usually required to assist him and send the electric cable connected to the pilot rope forward since the cable receives considerable friction on the cable racks as the cable is dragged thereon.

After electric cables are laid on such conventional overhead cable racks connected one after another in a line with conventional metal fasteners, the connection portions of the cable racks tend to open downward with time due to the weight of the cables laid on the cable racks, and the whole setting of the cable racks will become shaky with time. It may be required to periodically inspect the condition of the cable racks for safety. When disfigured connections between cable racks are discovered during an inspection, it will be necessary to lift the involving cable racks back to their proper positions and fasten the loosened bolts and nuts on the fasteners mounted on the disfigured connection portions of the cable racks, which is very troublesome and time consuming as well as costly.

Japanese Patent Laid-Open Publication No. 62-225118 teaches a connection structure for two cable racks, where cable racks are connected with metal fasteners which are fastened to cable racks on both sides thereof with bolts and nuts. The disclosed metal fastener is provided with a plurality of through holes, and the disclosed cable rack is also provided with corresponding through holes. The fastener is also provided with two longitudinally extending protrusion portions. The cable rack is also provided with two longitudinally extending protrusion portions corresponding to the longitudinally extending protrusion portions of the fastener. The protrusion portions of the fastener partially engage both the protrusion portions of two cable racks which are in alignment and contacting head and tail for further stabilization of the connection.

It is considerable trouble to adjust the orientation of a fastener, engage the protrusion portions thereof with those of two cable racks, and match the locations of the through bolt holes in the fastener and those of the two cable racks so that bolts can be properly inserted into the "double "through holes from inside the cable racks. Then nuts are put from outside the cable racks on the bolts coming out of those "double "through holes for fastening the fastener onto the two cable racks. It is time consuming to complete a cable laying route with a plurality of such cable racks and metal fasteners. There was not taught or suggested in the patent publication any improvement in cable laying operation using such apparatus.

Accordingly, it is an object of the present invention to provide an overhead cable laying system or apparatus which can be installed overhead very easily for laying linear materials including electric cables, communication cables, gas pipes, water pipes and tubes.

It is another object of the present invention to provide an overhead cable laying system or apparatus which is intact for a very long time of use.

It is another object of the present invention to provide an overhead cable laying system or apparatus which fascilitates an easy laying operation for linear materials.

Other objects of the present invention will become apparent from the following descriptions.

SUMMARY OF THE INVENTION

A cable laying apparatus of the present invention chiefly comprises a plurality of improved cable racks and improved fasteners. Adjacent two cable racks are connected with each other head and tail with two fasteners on both sides of the connection portion and a plurality of screws. The screws are screwed into a plurality of threaded holes provided in each fastener and press the cable racks on both sides for fastening the fasteners onto the cable racks.

A cable rack of the present invention generally comprises two rack frames and a plurality of bar members as cable floor means bridging the two rack frames in parallel. Each rack frame is provided with at least one longitudinally extending hook portion on the outer side thereof, which extends horizontally. A plurality of cable bar members can be replaced by a single flat plate member, if so desired. A cable rack of the present invention can be made as a single unit by plastic or metal protrusion means.

A fastener of the present invention is also generally provided with at least one longitudinally extending hook portion on the inner side thereof, which extends horizontally.

Cable racks and fasteners used to prepare a cable laying apparatus of the present invention both have the same number of such longitudinally extending hook portions such that the hook portions of the cable racks horizontally and correspondingly engage the longitudinally extending hook portions of the fasteners for securely holding the cable racks together in alignment.

Each fastener of the present invention is also provided with a plurality of threaded through screw holes. Adequate screws with a flat bottom are inserted into the through screw holes and fastened with a screw driver. It is possible to provide only a single threaded through screw hole in a fastener, though. No nuts are used in cable laying apparatuses of the present invention. Two cable racks are very securely connected head and tail in alignment with two fasteners with the functions of such screws and the aforedescribed engaging hook portions of the cable racks and the fasteners.

An advantage of a cable laying apparatus of the present invention comprising cable racks and corresponding fasteners is that it is much easier to prepare an overhead cable laying route using the apparatus of the present invention than using a conventional cable laying apparatus.

Another advantage of a cable laying apparatus of the present invention comprising cable racks and corresponding fasteners is that there is no need to precisely adjust the orientation of fasteners on cable racks since cable racks of the present invention do not have through holes to match the through screw holes of fasteners, therefore, screws are simply inserted into the through screw holes of fasteners from outside (not inside) and fastened. The hook portions of cable racks and those of fasteners are made to be easily engaged and securely fixed together as the screws are tightened.

Accordingly, another advantage of a cable laying apparatus of the present invention comprising cable racks and corresponding fasteners is that the engagement between the hook portions of fasteners and those of cable racks becomes tighter and securer as the screws in the through holes of fasteners are tightened, which means that the two racks are more precisely aligned and more stably fixed together as the screws in the through screw holes of fasteners are tightened.

A cable rack of the present invention each may be advantageously provided with at least one chute member for passing a cable laying device to be used to pull and lay a cable on the cable racks. A cable laying device generally comprises a head portion, a plate portion and a rope portion. Utilizing such a chute member and a cable laying device, a cable laying operation can be much simplified and less strenuous.

Since cable racks each with a chute member having a longitudinally extending opening portion therethrough will be precisely aligned head and tail when the screws in the through screw holes of the mounted fasteners are screwed, the chute members thereon will be precisely aligned to make a long chute with a long opening portion therethrough comprising a plurality of aligned chute members with an opening portion therethrough.

A cable laying device is inserted into the long chute at one end or opening and sent forward by hand by the rope portion thereof until the head portion of the cable laying device reaches the other end or another opening of the long chute. The rope portion of the cable laying device is flexible but rigid enough to be sent forward by hand together with the head portion and the plate portion thereof in the long chute. The head portion of the cable laying device is made in a shape which can move forward smoothly in the long chute. A connection rope extending from the plate portion of the cable laying device is connected to a cable at the other end or another opening of the long chute. The plate portion protrudes or sticks out from the long opening portion provided on the long chute. The cable laying device is then pulled back by hand by the rope portion through the long chute, and together with the cable laying device is pulled the cable on the parallel bar members or flat plate members of the cable racks. A cable is thus laid on the cable racks each having a chute member.

Accordingly, another advantage of a cable laying apparatus of the present invention comprising cable racks each having such a chute member and corresponding fasteners is that a cable can be very easily laid on an overhead cable laying route.

Other advantages and features of the present invention will be more fully understood from the following detailed description which should be read in light of the accompanying drawings in which reference numerals and letters refer to corresponding parts throughout the several views.

DETAILED DESCRIPTION OF THE PREFERRED EMBODIMENT

Figure 1:
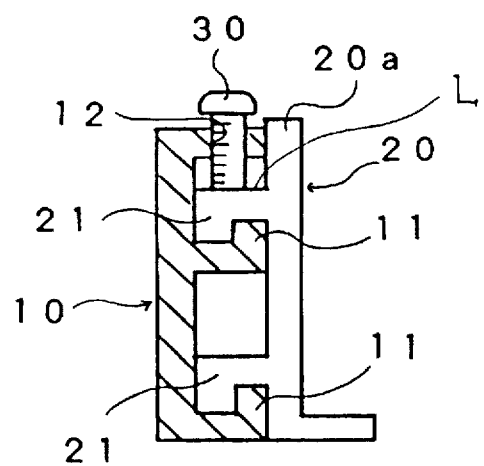
FIG. 1 is a cross-sectional view of a fastener and a rack frame of a corresponding cable rack according to an embodiment of the present invention, showing the engagement between the fastener and the rack frame.

FIG. 1 shows an embodiment of a cable rack frame 20a and a corresponding fastener 10. The cable rack 20 (partially shown) comprises two such rack frames 20a and a plurality of bar members 20b (not shown) as cable floor means. The plurality of bar members 20b are placed between the two rack frames 20a. A flat plate member (not shown) may replace the plurality of bar members 20b.

The fastener 10 has a longitudinal horizontal top extension or top hook portion and two other longitudinal horizontal hook portions 11. The lower two hook portions 11 each has a groove opening upward. The rack frame 20 has two longitudinal hook portions 21. Each hook portion 21 has a groove opening downward.

The fastener 10 is provided with a plurality of threaded through screw holes 12 on the horizontal top extension of the fastener 10. The number of such through screw holes 12 can be just one, if so desired. After the fastener 10 is mounted on the connection portion of two such rack frames 20a to connect two cable racks 20 together head and tail in alignment by engaging the lower hook portions 11 of the fastener 10 and the hook portions 21 of the two rack frames 20a, screws 30 are inserted in the plurality of the threaded through screw holes 12 and screwed thereinto. The screws 30 press the horizontal top extensions of the two rack frames 20a with their flat bottoms. As the screws 30 are screwed into the threaded through screw holes 12, the fastener 10 is lifted in the reverse direction of the screws 30 and the lower hook portions 11 of the fastener 10 are pressed harder against the hook portions 21 of the two rack frames 20a which engage the lower hook portions 11 of the fastener 10.

There is no need to adjust the orientation of the fastener 10 with the two rack frames 20a very carefully since the rack frame 20 does not have any through holes to match the through screw holes 12 of the fastener 10. Thus, the two cable racks 20 are connected easily and stably together head and tail with the fastener 10. A fastener 10 is to be provided on each side of the two cable racks 20.

Such fasteners 10 with a top hook portion and two lower hook portions 11 and rack frames 20a with two hook portions 21 can be made each as a single unit of a metal such as aluminum or a plastic material by protrusion means or other production means.

Figure 2:
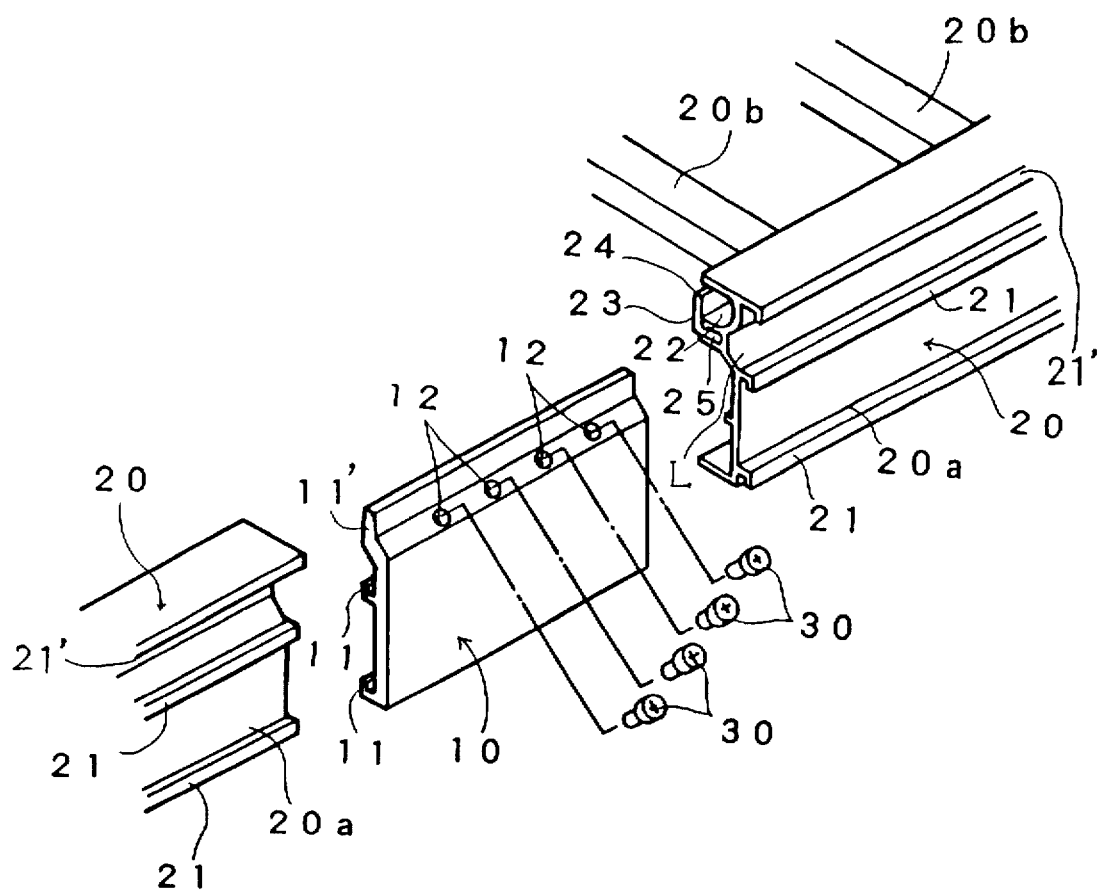
FIG. 2 is a partial perspective view of cable racks and a corresponding fastener according to another embodiment of the present invention.
Figure 3:
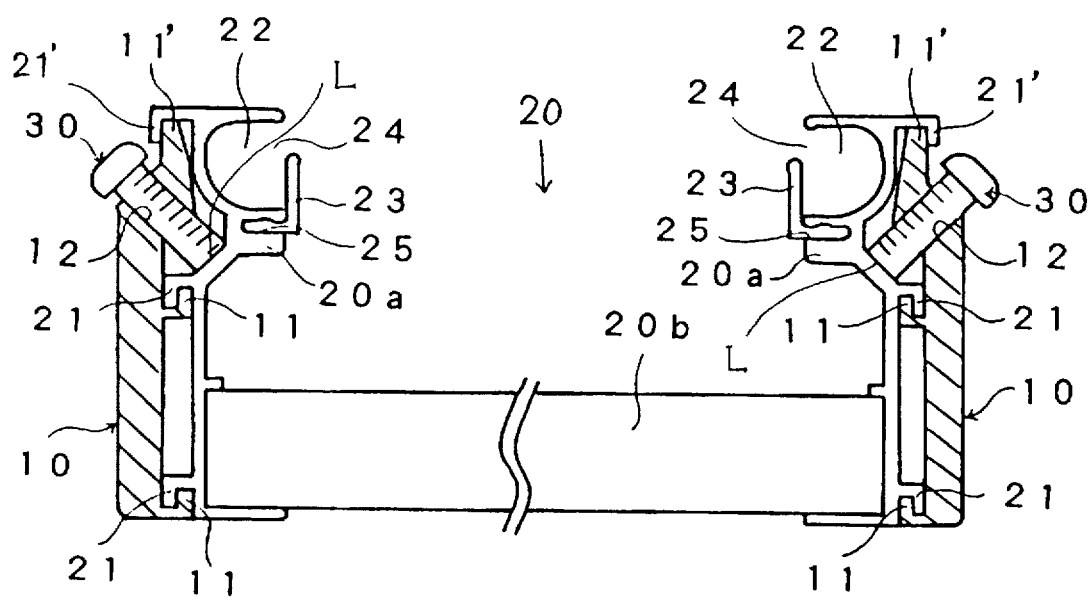
FIG. 3 is a cross-sectional view of the fasteners in use on both sides of the cable racks both shown in FIG. 2, showing the engagement between the fasteners and the cable racks.
Figure 4:
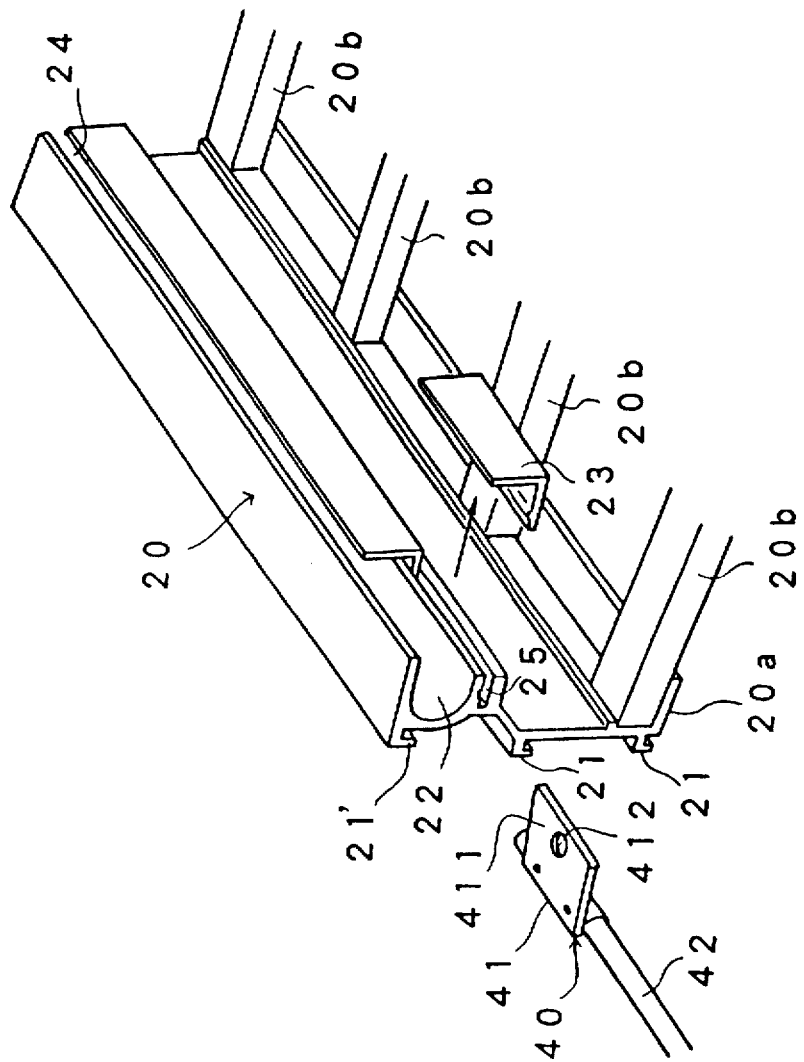
FIG. 4 is a partial perspective view of the cable rack shown in FIG. 2, showing a use of the chute member thereof and a cable laying device.

FIGS. 2, 3 and 4 show another embodiment of a cable laying apparatus comprising cable racks 20 and corresponding fasteners 10 according to the present invention. The cable rack 20 comprises two rack frames 20a and a plurality of parallel bar members 20b placed on the two horizontally extending inner bottom plates of the two frames 20a and bridging the two rack frames 20a. The bar members 20b can be replaced by a flat plate member (not shown). In this embodiment, the rack frame 20a has three longitudinally and horizontally extending hook portions 21' and 21 on its outer side each having a groove which opens downward.

The fastener 10 has a longitudinally and horizontally extending rail portion 11' (hereinafter referred to just as hook portion 11') and two longitudinally extending hook portions 11 on its inner side which respectively correspond to the hook portions 21' and 21 of the cable frame 20a. The two lower hook portions 11 of this fastener 10 are each provided with a groove which opens upward, while the top hook portion 11' of the fastener 10 has no groove in this embodiment.

The hook portions 11' and 11 of the fastener 10 are made to be respectively received upwardly by the hook portions 21' and 21 of two rack frames 20a placed contactingly head and tail. When two cable racks 20 are placed contactingly in a line and a fastener 10 is mounted on each outer side of the connection part of the two contacting rack frames 20a by inserting the hook portions 11' and 11 of the fastener 10 upwardly into the corresponding grooves of the hook portions 21' and 21 of the frames 20a, the fastener 10 is restricted from moving further upward or sideway.

The fastener 10 is also provided with a plurality of threaded through screw holes 12 to receive screws 30 whose bottoms are made flat. The threaded screw holes 12 are provided on the longitudinally extending oblique surface provided on the outer side of the fastener 10 such that the screw holes 12 receive the screws 30 obliquely, as shown in FIG. 3.

The rack frame 20a is also provided on its outer side with a longitudinally extending oblique surface (L) which becomes parallel to the oblique surface of the fastener 10 when the fastener 10 is received by the rack frames 20a of two cable racks 20. The longitudinally extending oblique surface (L) receives the screws 30 by their flat bottoms. The number of such threaded through screw holes 12 can be just one, if so desired.

The fasteners 10 are mounted on the connection portion of the roughly aligned cable racks 20 on both sides without need to precisely aligning the two cable racks 20. Then, screws 30 are inserted in the through screw holes 12 of the fasteners 10.

When the screws 30 in the screw holes 12 are tightly screwed into the screw holes 12 and press the oblique surfaces (L) of the rack frames 20a with their flat bottoms, the cable racks 20 are precisely and automatically aligned and fixed tightly and securely together assisted by the function of the engaging hook portions 11' and 11 and 21' and 21, as shown in FIG. 3. The engagement between the hook portions 11' and 11 of the fasteners 10 and the hook portions 21' and 21 of the rack frames 20a becomes tighter as the screws 30 in the through screw holes 12 are further tightened, since the fasteners 10 move in the direction (f) (FIGS. 5 and 6) reverse to the direction of movement (F) (FIGS. 5 and 6) of the screws 30, pressing the hook portions 11' and 11 of the fasteners 10 harder against the hook portions 21' and 21 of the rack frames 20a (f1, f2, f'1, f'2 in FIGS. 5 and 6). The engagement between the hook portions 11' and 11 of the fasteners 10 and the hook portions 21' and 21 of the cable racks 20 is securer than that of the embodiment shown in FIG. 1, since the pressure given to the hook portions 11' and 11 of the fasteners 10 by the screws 30 as they advance in the through screw holes 12 is in two directions, upward and sideway in this embodiment. Thus, the cable racks 20 can be more easily and securely fixed together with the fasteners 10 and the cable racks 20 of this embodiment.

Such rack frames 20a and fasteners 10 may each be made as a single unit of a metal such as aluminum or a plastic material by protrusion means.

The rack frame 20a may advantageously be provided with a longitudinally and horizontally extending chute member 22 with a longitudinally extending opening portion therethrough as shown in FIG. 3. The opening portion is to be partially covered with a longitudinally extending cover member 23 leaving a longitudinally extending open slit 24. The cover member 23 may have an insertion wing portion which is received in the groove 25 provided on the rack frame 20a, and the cover member 23 is mounted on the rack frame 20a by means of the groove 25 as shown in FIG. 3. Such a rack frame 20a with a chute member 22 can be made as a single unit of a metal such as aluminum or a plastic material.

A long chute is prepared along a cable laying route by putting a plurality of cable racks 20 in alignment, comprising chute members 22 of the cable racks 20. The long chute receives a cable laying device 40 to be used for laying a cable on the bar members 20b. The cover member 23 may be provided with a cover portion which is attachable to and removable from the cover member 23. A cable laying device 40 comprising a head portion 41, a plate portion 411 with a connection hole 412, and a rope portion 42 is inserted into the long chute from the opening made when the removable cover portion of the cover member 23 is removed.

The rope portion 42 of the cable laying device 40 is flexible but rigid enough to be sent forward by hand through the long chute together with the head portion 41 and the plate portion 411 which travels through a longitudinally prepared open slit 24.

When the head portion 41 of the inserted cable laying device 40 reaches another opening provided in the cover member 23, a cable (X) (FIG. 13) is connected to the plate portion 411 of the cable laying device 40 with a connection rope (R) (FIG. 13) tied to the connection hole 412 provided in the plate portion 411. The plate portion 411 sticks out of the longitudinal open slit 24 and travels through the long slit 24.

The cable (X) is dragged on the bar members 20b of the cable racks 20 as the cable laying device 40 is pulled back through the long chute by hand by the rope portion 42. As the head portion of the cable (X) does not touch the bar members 20b, thus considerably decreasing the friction between the cable (X) and the bar members 20b, pulling and laying the cable (X) on the bar members 20b is considerably less strenuous.

The removed cover portions of the cover members 23 are returned to their original places after having laid the cable (X) on the bar members 20b.

Figure 5:
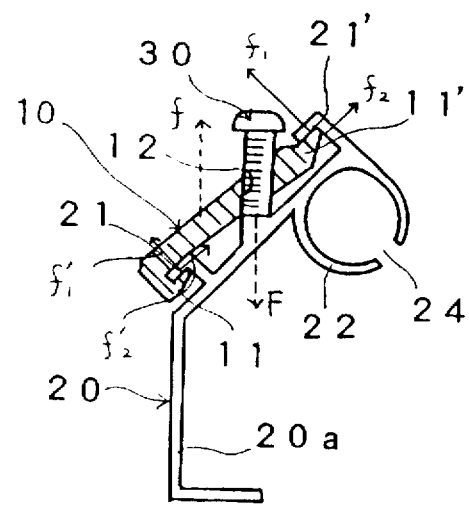
FIG. 5 is a cross-sectional view of a fastener in use on a rack frame of a cable rack according to another embodiment of the present invention, showing the engagement between the fastener and the rack frame.

FIG. 5 shows another embodiment of a cable laying apparatus comprising cable racks 20 and fasteners 10 according to the present invention. Here, the rack frame 20a is provided with two hook portions 21' and 21, and the fastener 10 is provided with a corresponding hook portion 11' and 11. The chute member 22 is cylindrical with a longitudinal slit 24. The hook portions 21' and 21 of the rack frame 20a are provided on the longitudinal oblique surface of the rack frame 20a.

The threaded through screw holes 12 are provided on the fastener 10 such that the direction of the through screw holes 12 becomes substantially vertical when the fastener 10 is properly mounted on the rack frames 20a. Screws 30 each with a flat bottom are screwed into the substantially vertical through screw holes 12 pressing the rack frames 20a substantially vertically downward with their flat bottoms, while the fastener 10 is lifted substantially vertically upward tightening the engagement between the hook portions 21' and 21 of the rack frame 20a and the corresponding hook portions 11' and 11 of the fastener 10 in two directions.

The engagement between the hook portions 11' and 11 and the corresponding hook portions 21' and 21 is so secure that the fasteners 10 will not move in any direction any more. Thus the cable racks 20 are securely held together in alignment by the fasteners 10 provided on both sides. Here also, the number of threaded through screw holes 12 may be just one, if so desired.

Figure 6:
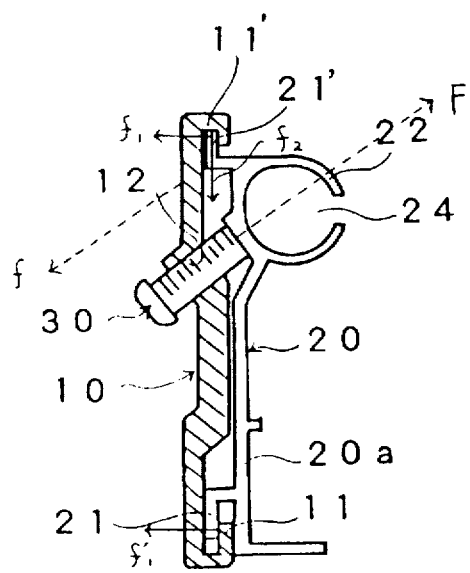
FIG. 6 is a cross-sectional view of a fastener in use on a rack frame according to another embodiment of the present invention, showing the engagement between the fastener and the rack frame.
Figure 7:
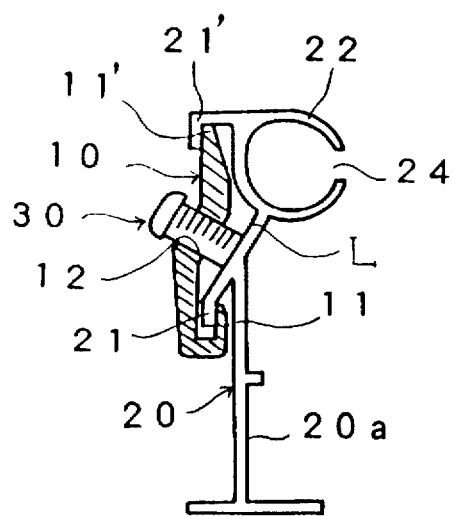
FIG. 7 is a cross-sectional view of a fastener in use on a rack frame according to another embodiment of the present invention, showing the engagement between the fastener and the rack frame.
Figure 8:
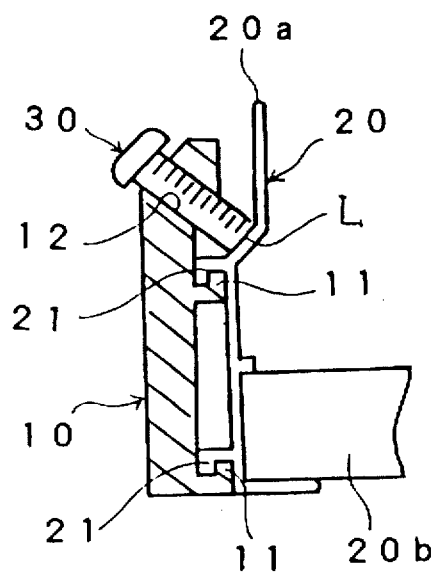
FIG. 8 is a cross-sectional view of a fastener in use on a rack frame as well as a portion of a bar member of a cable rack according to another embodiment of the present invention, showing the engagement between the fastener and the rack frame as well as the setting of the bar member.
Figure 9:
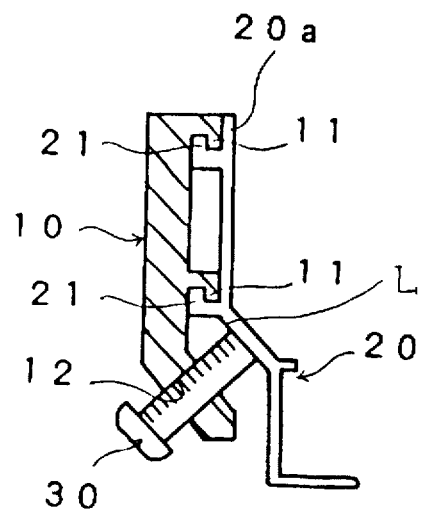
FIG. 9 is a cross-sectional view of a fastener in use on a rack frame according to another embodiment of the present invention, showing the engagement between the fastener and the rack frame.
Figure 10:
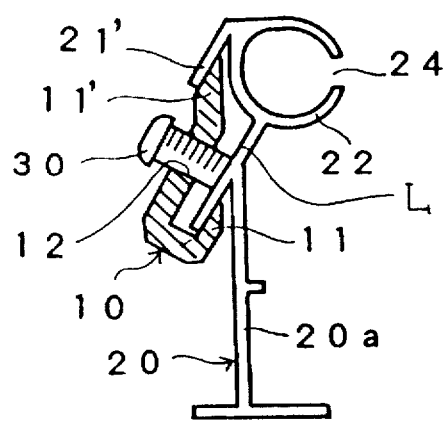
FIG. 10 is a cross-sectional view of a fastener in use on a rack frame according to another embodiment of the present invention, showing the engagement between the fastener and the rack frame.
Figure 11:
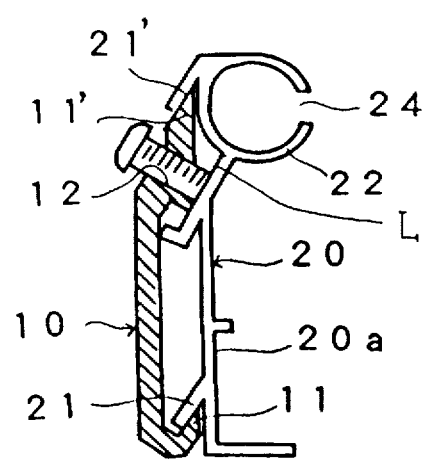
FIG. 11 is a cross-sectional view of a fastener in use on a rack frame according to another embodiment of the present invention, showing the engagement between the fastener and the rack frame.

FIG. 6 shows another embodiment of a cable laying apparatus comprising cable racks 20 and fasteners 10 according to the present invention. Here, the fastener 10 is provided with two hook portions 11' and 11, a top hook portion and a bottom hook portion. The top hook portion 11' opens downward and the bottom hook portion 11 opens upward. The rack frame 20a is also provided with two hook portions 21' and 21, a top hook portion and a bottom hook portion. The top hook portion 21' of the rack frame 20a opens upward and the bottom hook portion 21 opens downward.

The top hook portion 11' of the fastener 10 engages the top hook portion 21' of the rack frame 20a, and the bottom hook portion 11 of the fastener 10 engages the bottom hook portion 21 of the rack frame 20a. The chute member 22 is cylindrical and has a longitudinal slit 24 therethrough.

The threaded through screw holes 12 are provided in the fastener 10 in the upper right direction in this figure to receive screws 30 in the upper right direction. Cable racks 20 are fixed tightly together head and tail with the fasteners 10 on both sides and the screws 30 in the threaded screw holes 12. Here also, the cable racks 20 are securely fixed together in alignment with the fasteners 20 with the fasteners 10 provided on both sides. The engagement between the hook portions 11' and 11 of the fasteners 10 and the hook portions 21' and 21 of the cable racks 20 is in two directions in this case also. Here, too, the number of through screw holes 12 may be just one, if so desired.

FIGS. 7–11 show other modified embodiments of the present invention. Although the number of hook portions of the fasteners 10 and the cable racks 20 are not necessarily equal, or the shape of such hook portions 11 (11') and 21 (21') are not necessarily equal, or whether chute members 40 are provided or not, or the direction of their threaded through screw holes 12 are not necessarily the same, the engagement between the hook portions 11 (11') of the fasteners 10 and the hook portions 21 (21') of the cable racks 20 is very secure in two directions.

Figure 12:
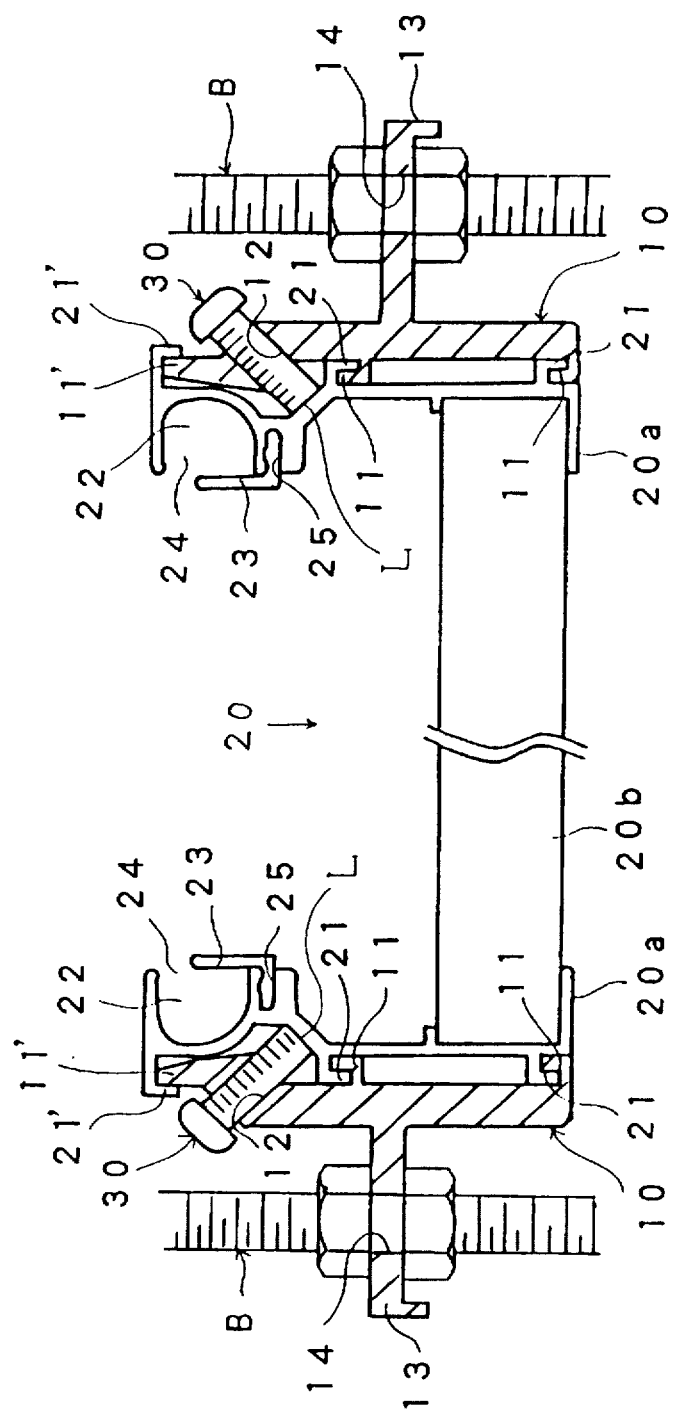
FIG. 12 is a cross-sectional view of fasteners each having a horizontally extending arm portion to be used for suspending cable racks according to another embodiment of the present invention, showing how the cable racks fixed by the fasteners each with such an arm portion are suspended from a ceiling or a wall (not shown).

FIG. 12 shows an actual installation of a cable laying apparatus or system comprising cable racks 20 and fasteners 10 according to one embodiment of the present invention. The fastener 10 is additionally provided with an arm portion 13 extending sideway with a threaded through hole 14 therein for attaching threaded suspension means (B) to be fastened through the through hole 14 with two bolts. The suspension means (B) is suspended from a ceiling or a wall (not shown). The whole apparatus can be easily suspended from a ceiling or a wall with such suspension means (B) on both sides of the cable racks 20.

The chute members 22 of the cable racks 20 are substantially automatically aligned to prepare a long chute as the screws 30 in the threaded through holes 12 of the fasteners 10 are tightened. The long chute prepared as such facilitates a smooth passing of a cable laying device 40. Therefore, installation of a cable laying apparatus of the present invention under a ceiling and laying a cable (X) thereon can be performed very easily with least labor.

Figure 13:
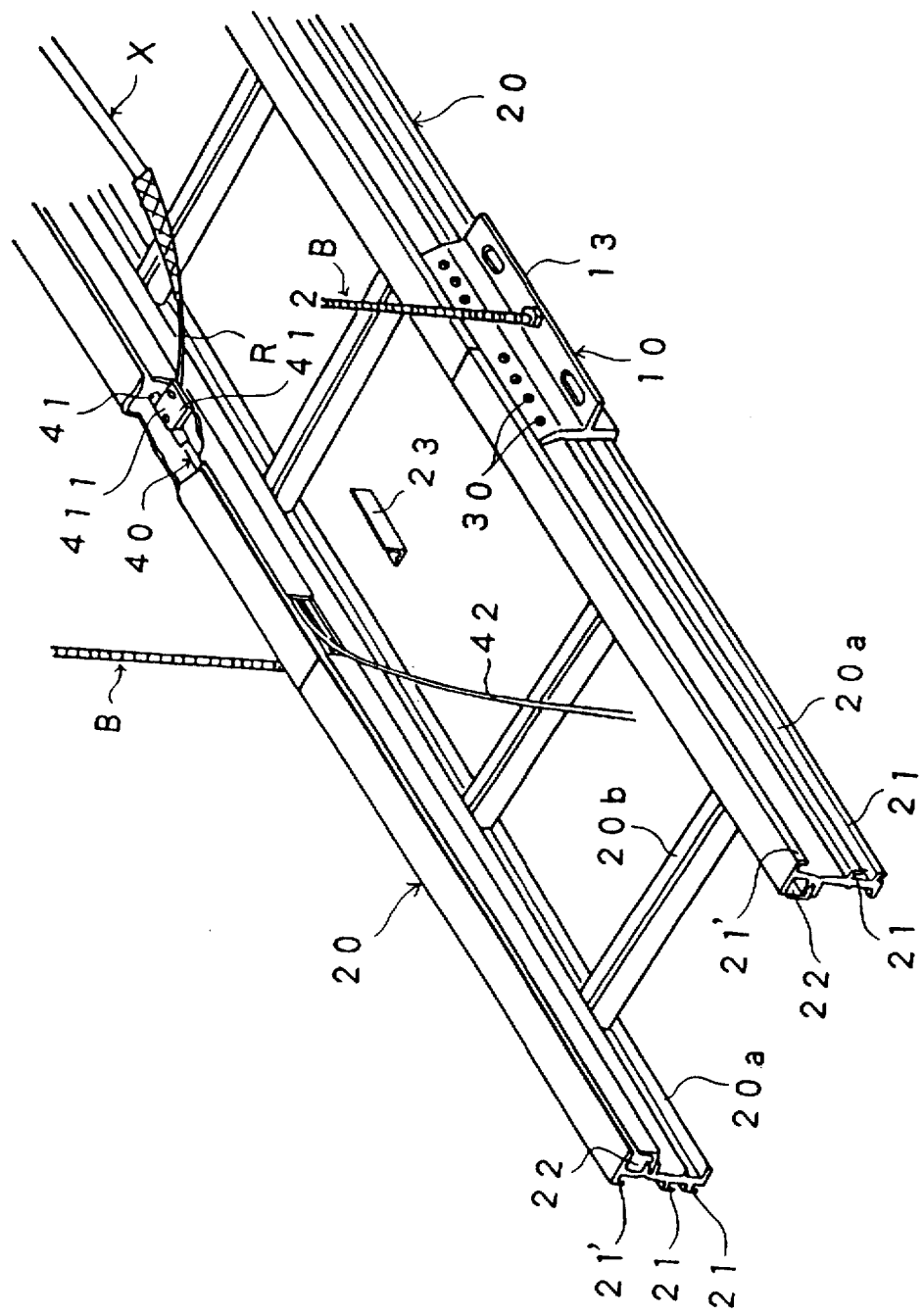
FIG. 13 is a partial perspective view of the cable racks connected with the fasteners shown in FIG. 12, showing how a cable is laid on tie cable racks using the chute member and a cable laying device.

FIG. 13 shows how a cable (X) is laid on the cable laying apparatus according to an embodiment of the present invention. The cable laying device 40 has a head portion 41 with a plate portion 411 which are made of a hard material and a rope member 42 which is flexible but rigid enough to be sent forward by hand through the long chute together with the head portion 41 and the plate portion 411 thereof.

On the head portion 41 is provided a plate portion 411 which is to protrude from the longitudinally prepared open slit 24 and slides therethrough, pulling a cable (X) connected to the cable laying device 40 by means of a connection rope (R) which is attached to the plate portion 411 by means of the connection hole 412 provided in the plate portion 411.

The cable laying device 40 is first sent forward by hand through the long chute comprising a plurality of aligned chute members 22 of cable racks 20. When the head portion 41 reaches another opening portion of the long chute, a cable (X) is connected to the connection rope (R). The cable laying device 40 is then pulled back through the long chute, dragging the cable (X) on the bar members 20b. In order to lay a cable (X) in a long cable route comprising many cable racks 20, the described cable laying operation is repeated as required.

Figure 14:
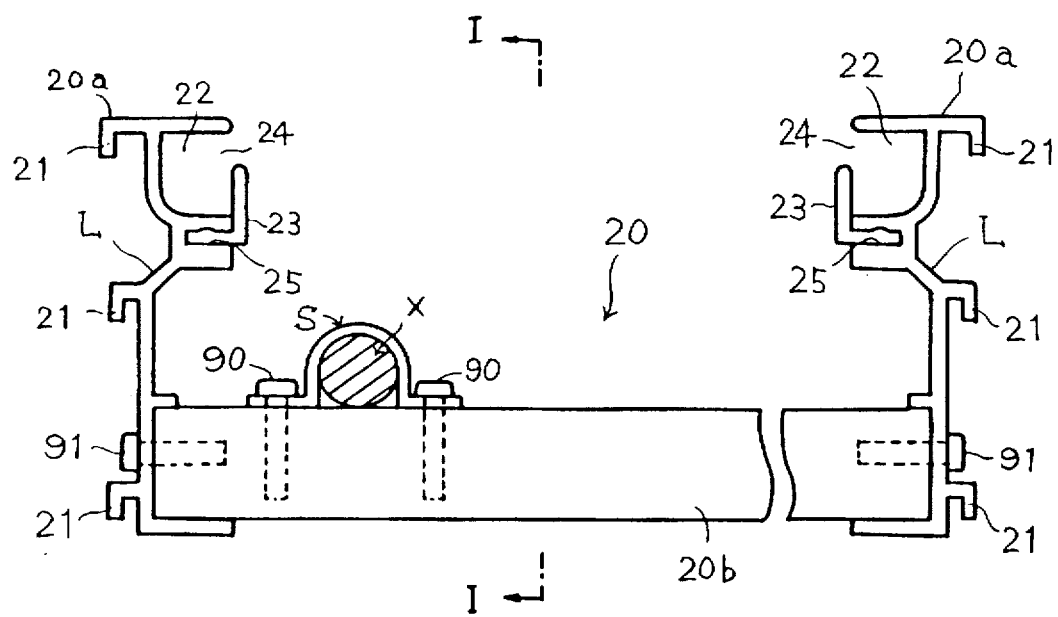
FIG. 14 is a front view of a cable rack according to another embodiment of the present invention, showing that a cable laid on the cable rack is fixed to the bar members with saddle means.
Figure 15:
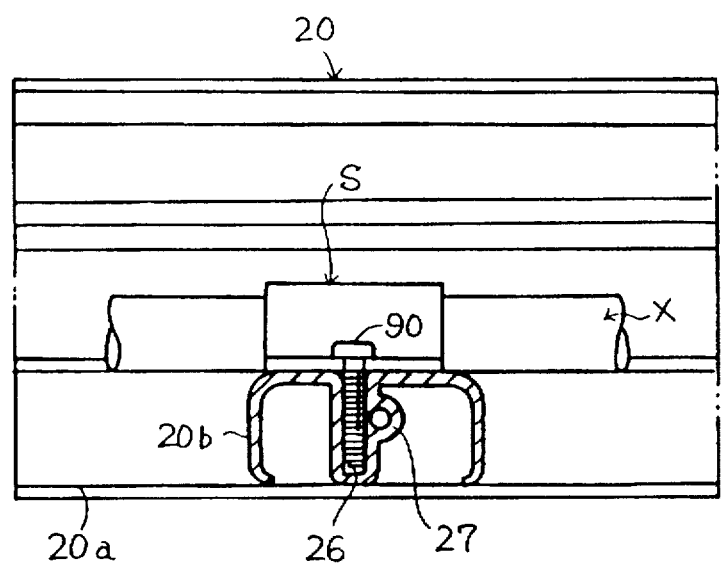
FIG. 15 is a partial cross-sectional view of the cable rack shown in FIG. 14 cut longitudinally along line I—I.

FIGS. 14 and 15 show a modification of a cable rack 20 of the present invention. Here, each bar member 20b or some selected bar member 20b are provided with saddle means (S). The saddle means (S) covers the cable (X) after the cable (X) is laid on the bar members 20b. The saddle means (S) are then fastened to the bar members 20b with bolts 90 which are received in the threaded bolt holes 26 provided in the bar members 20b.

The bar members 20b may be each secured to the frames 20a with bolts 91 which are received in the bolt holes 27 provided in the rack frames 20a so that the bar members 20b can be mounted between the rack frames 20a more securely.

Figure 16:
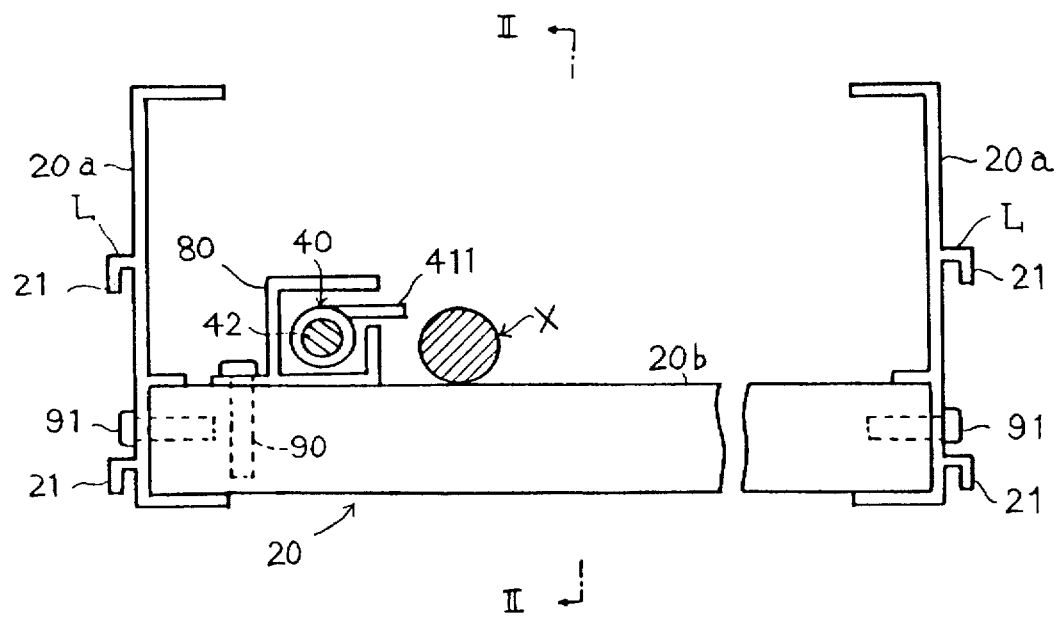
FIG. 16 is a front view of a cable rack according to another embodiment of the present invention, showing another way to lay a cable on the cable rack using a chute.
Figure 17:
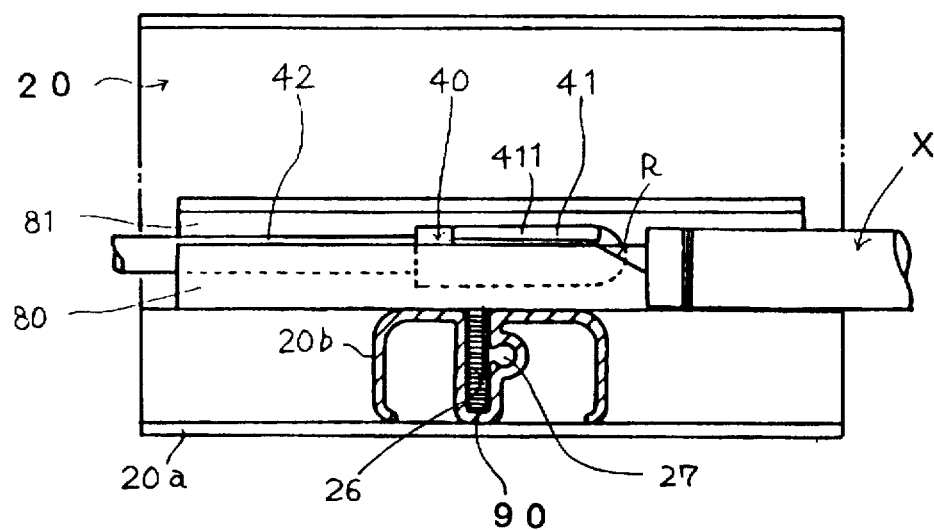
FIG. 17 is a partial cross-sectional view of the cable rack shown in FIG. 16 cut longitudinally along line II—II.

FIGS. 16 and 17 show another modification of a cable rack 20 of the present invention. The rack frame 20a does not have a chute member 22. Instead, a chute member 80 with a longitudinally extending open portion is provided on the bar members 20b of the cable rack 20 with bolt means 90 to be fixed in the bar members 20b. A cable (X) is laid on the bar members 20b using the long chute comprising such chute members 80 and a cable laying device 40 as described earlier.

Figure 18:
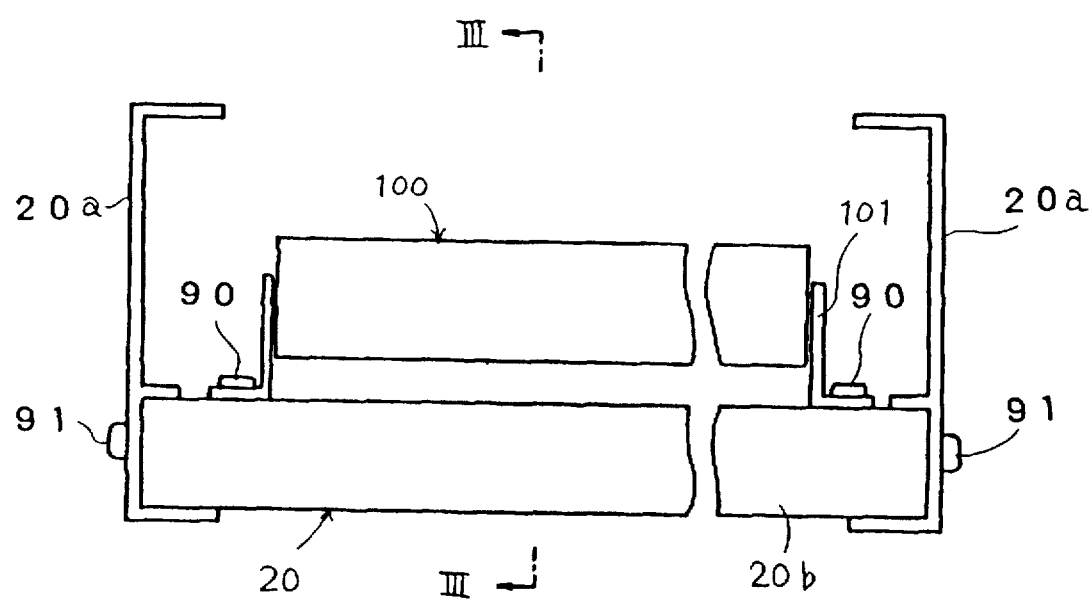
FIG. 18 is a front view of a cable rack according to another embodiment of the present invention, showing another way to lay a cable on the cable rack.
Figure 19:
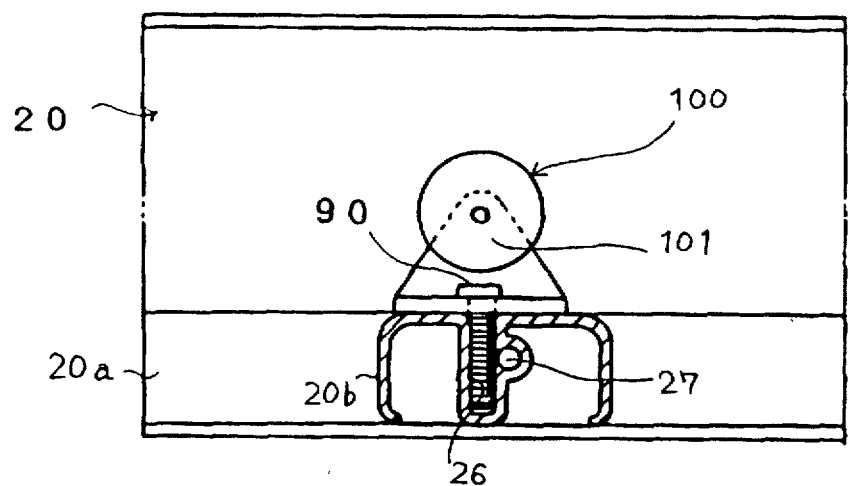
FIG. 19 is a partial cross-sectional view of the cable rack shown in FIG. 18 cut longitudinally along line III—III.

FIGS. 18 and 19 show another modification of a cable rack 20 of the present invention. Here, each bar member 20b or some selected bar members 20b of the cable rack 20 are provided with roller means 100 supported by two roller supporters 101 on both sides thereof. The roller means 100 facilitates smooth laying of a cable (X) on the bar members 20b. In this modification, chute members 22 or 80 may or may not be provided.

A cable (X) may be directly laid on the roller means 100, or may be indirectly laid on the roller means 100 in that a pilot rope (not shown) is first laid on the roller means 100 and a cable (X) connected to the pilot rope on either end of the pilot rope is dragged on the roller means 100 and introduced onto the cable racks 20.

The rack frame 20a of the cable rack 20 may be provided with a chute member 22 (not shown here) as set forth earlier. Then, a cable (X) will be laid on the roller means 100 as described earlier with the embodiments using such chute means.

The present invention should be considered in light of the foregoing specification to include all embodiments identified by the appended claims, as well as all equivalents thereof.

Having described the invention, what is claimed is:

1. A rack frame for a cable rack, comprising:

a) a frame body;

b) longitudinally extending chute means provided on said frame body;

c) cable floor mounting means provided on said frame body;

d) at least two longitudinally extending outer hook portions provided in parallel on said frame body for partially engaging longitudinally extending engagement hook portions of a fastener means, said fastener means having at least two threaded through screw holes; and e) a longitudinally extending screw receiving surface provided on said frame body, wherein said screw receiving surface is provided to receive screw means through said screw holes in a substantially different orientation from the direction of said partial hook engagement so that said partial hook engagement becomes more secure as said screw means is fastened further in said screw holes and readily and securely aligns said chute means with chute means of another rack frame.

2. A rack frame according to claim 1, wherein said chute means is provided between said at least two outer hook portions in elevational position.

3. A rack frame according to claim 1, wherein said screw receiving surface is provided between said at least two outer hook portions in elevational position.

4. A cable rack, comprising a rack frame according to claim 1, an opposite side frame having cable hook mounting means, and cable floor means mounted between said rack frame and said opposite side frame.

5. A cable rack, comprising two rack frames according to claim 1 and cable floor means mounted between said two rack frames.

6. A cable rack fastener to be used for securing together in longitudinal alignment two rack frames, each said rack frame having a longitudinally extending screw receiving surface, at least two longitudinally extending outer hook portions, and longitudinally extending chute means, said cable rack fastener comprising:

a) a fastener body;

b) at least two longitudinally extending engagement hook portions provided on said fastener body to engage said longitudinally aligned hook portions of said two longitudinally aligned rack frames; and c) at least two threaded through screw holes formed in said fastener body and positioned so that screw means screwed through said screw holes can contact said two screw receiving surfaces.

* * * * *